(12) United States Patent
Mistry et al.

(10) Patent No.: US 12,271,214 B2
(45) Date of Patent: Apr. 8, 2025

(54) MINIATURE PASSIVE THERMAL CONTROL VALVE FOR MIXING OR SPLITTING SINGLE-PHASE FLUID WITH ADJUSTABLE THERMAL ACTUATOR

(71) Applicant: KALSI ENGINEERING, INC., Sugar Land, TX (US)

(72) Inventors: Mital Chandrakant Mistry, Richmond, TX (US); Zachary W. Leutwyler, Richmond, TX (US); Aaron P. Richie, Missouri City, TX (US); Manmohan S. Kalsi, Houston, TX (US)

(73) Assignee: KALSI ENGINEERING, INC., Sugar Land, TX (US)

( * ) Notice: Subject to any disclaimer, the term of this patent is extended or adjusted under 35 U.S.C. 154(b) by 0 days.

(21) Appl. No.: 18/640,268

(22) Filed: Apr. 19, 2024

(65) Prior Publication Data
US 2024/0288886 A1 Aug. 29, 2024

Related U.S. Application Data

(63) Continuation of application No. 17/898,204, filed on Aug. 29, 2022, now Pat. No. 11,989,043.
(Continued)

(51) Int. Cl.
*F16K 31/00* (2006.01)
*G05D 7/01* (2006.01)

(52) U.S. Cl.
CPC ......... *G05D 7/0126* (2013.01); *F16K 31/002* (2013.01)

(58) Field of Classification Search
CPC ...... F16K 31/002; F16K 11/044; F16K 31/52; F16K 11/07; G05D 23/022; G05D 23/1373; G05D 7/0126
See application file for complete search history.

(56) References Cited

U.S. PATENT DOCUMENTS

| 237,624 A | 2/1881 | Soule |
|---|---|---|
| 3,118,648 A | 1/1964 | Lyons |

(Continued)

FOREIGN PATENT DOCUMENTS

CN 104390423 A * 3/2015

OTHER PUBLICATIONS

CN 104390423 Translation (Year: 2015).*
(Continued)

*Primary Examiner* — Umashankar Venkatesan
(74) *Attorney, Agent, or Firm* — Bracewell LLP; Douglas W. Rommelmann (57) ABSTRACT

A passive thermal control valve comprising a thermal actuator coupled to a valve body having first and second ports. The thermal actuator including an actuator body having an inner bore. An adjustment stop engages the actuator body. A cylinder is received within the actuator body inner bore and the cylinder has a cylinder bore open at one end. An actuator spring within the actuator body biases the cylinder towards the adjustment stop. An actuator rod is at least partially received within the cylinder and has first and second ends. At least a portion of the actuator rod is allowed to extend through the open cylinder bore. A sealing element forms a seal between the actuator rod and the cylinder and defines a sealed chamber within the cylinder. A thermal fluid is contained within the cylinder. A lever mechanism is connected to the valve body and includes a lever having a first end connected to the valve body. A valve spool is connected to a lever second end. The valve spool is arranged and designed to close the first port and allow a system fluid to flow through the second port, close the second port and allow the system fluid to flow through the first port, or allow the system fluid to flow through both the first and second ports.

34 Claims, 10 Drawing Sheets

Related U.S. Application Data (60) Provisional application No. 63/360,049, filed on Aug. 30, 2021.

(56) References Cited

U.S. PATENT DOCUMENTS

| | | |
|---|---|---|
| 3,194,009 A | 7/1965 | Baker |
| 3,404,837 A | 10/1968 | James |
| 3,528,087 A | 9/1970 | Perkins |
| 3,995,607 A | 12/1976 | Ludwig et al. |
| 4,024,909 A | 5/1977 | Hofmann, Jr. |
| 4,176,630 A | 12/1979 | Elmer |
| 4,193,416 A | 3/1980 | Slawson |
| 4,483,512 A | 11/1984 | Drapeau |
| 4,508,142 A | 4/1985 | Eburn, Jr. et al. |
| 4,763,834 A | 8/1988 | Duprez |
| 4,838,308 A | 6/1989 | Thomas |
| 5,018,665 A | 5/1991 | Sulmone |
| 5,026,022 A | 6/1991 | Bastle |
| 5,148,976 A | 9/1992 | Reid |
| 5,251,663 A | 10/1993 | Christianson et al. |
| 6,067,791 A | 5/2000 | Patel |
| 6,145,541 A | 11/2000 | Hirota |
| 6,575,707 B2 | 6/2003 | Matt et al. |
| 6,604,687 B2 | 8/2003 | Goncze et al. |
| 7,140,382 B2 | 11/2006 | Kempf et al. |
| 7,424,978 B2 | 9/2008 | Vasquez et al. |
| 7,621,461 B2 | 11/2009 | Trantham et al. |
| 7,681,804 B2 | 3/2010 | Lockhart |
| 7,726,584 B2 | 6/2010 | Loe et al. |
| 8,336,849 B2 | 12/2012 | Farner |
| 8,360,335 B2 | 1/2013 | Gross |
| 8,616,237 B2 | 12/2013 | Jansen et al. |
| 8,708,243 B2 | 4/2014 | Cameron et al. |
| 8,881,992 B2 | 11/2014 | Vanderveen et al. |
| 9,115,816 B2 | 8/2015 | Steveley et al. |
| 9,353,689 B2 | 5/2016 | Ogata et al. |
| 9,382,833 B2 | 7/2016 | Morein |
| 9,733,028 B2 | 8/2017 | Scott et al. |
| 9,884,213 B2 | 2/2018 | Barry et al. |
| 9,976,550 B2 | 5/2018 | Kimberlin |
| 10,006,552 B1 | 6/2018 | Herbert |
| 10,184,735 B2 | 1/2019 | Sheppard et al. |
| 10,197,177 B2 | 2/2019 | Kumar et al. |
| 10,274,099 B2 | 4/2019 | Michnevitz et al. |
| 10,337,411 B2 | 7/2019 | Miranda et al. |
| 10,495,720 B2 | 12/2019 | Plourde et al. |
| 10,604,281 B2 | 3/2020 | Raven et al. |
| 10,754,364 B2 | 8/2020 | Sheppard et al. |
| 11,187,336 B2 | 11/2021 | Morgan et al. |
| 11,261,852 B2 | 3/2022 | Broccolini et al. |
| 2020/0025049 A1 | 1/2020 | Domínguez et al. |
| 2022/0381358 A1 | 12/2022 | Fuyuki |

OTHER PUBLICATIONS

Hartenstine et al., "Passive Control of a Loop Heat Pipe with Thermal Control Valve for Lunar Lander Application," AIAA 2012-3542, 42nd International Conference on Environmental Systems, Jul. 2012.

Hydraulic Control Valve Parts 491-2873-238 Spool, Terre Kosen Hydraulic, https://www.terrekosen-hydraulic.com/hydraulic-control-valve-parts-491-2873-238-spool-p-231.html.

\* cited by examiner

MINIATURE PASSIVE THERMAL CONTROL VALVE FOR MIXING OR SPLITTING SINGLE-PHASE FLUID WITH ADJUSTABLE THERMAL ACTUATOR

CROSS-REFERENCE TO RELATED APPLICATIONS

This application is a continuation of U.S. application Ser. No. 17/898,204, filed Aug. 29, 2022, which claims the benefit of U.S. Provisional Application Ser. No. 63/360,049 filed on Aug. 30, 2021. Applicant incorporates by reference herein application Ser. Nos. 17/898,204 and 63/360,049 in their entireties.

STATEMENT REGARDING FEDERALLY SPONSORED RESEARCH OR DEVELOPMENT

This invention was made with Government support under Contract No. 80NSSC21C0239, awarded by NASA (National Aeronautics and Space Administration) Shared Services Center (NSSC). The Government therefore has certain rights in this invention.

BACKGROUND OF THE INVENTION

1. Field of the Invention

The present invention relates generally to a thermal control valve, more particularly to a miniature passive thermal control valve having an adjustable thermal actuator, and even more particularly to a miniature passive thermal control valve for mixing or splitting single-phase fluid having an adjustable thermal actuator.

2. Description of the Related Art

Passive thermal control valve assemblies are known in the art. Such assemblies do not require a power source, such as a battery or DC power supply to operate. The thermal control valve includes a thermal actuator that actuates in response to the change in temperature of the system fluid. The motion is typically a linear movement of a rod within a cylinder of an actuator housing. A temperature-sensing material sealed within the cylinder expands and contracts based on the temperature of the device. The temperature-sensing material can be a liquid or wax-like substance or any other material that changes volume based on the temperature range anticipated by the actuator.

When the temperature-sensing material experiences a temperature increase, the substance expands in volume. The expansion pushes against the rod forcing the rod to extend out of the cylinder. When the temperature of the temperature-sensing material cools, the volume of the substance contracts which pulls the rod inside the cylinder.

Thermal actuators have certain advantages compared to more conventional solutions. A conventional solution would be to provide a solenoid, temperature sensor, electronic control circuitry, and a battery or DC power supply. A thermal actuator inside of a thermal control valve enables it to operate as a single device that integrates temperature sensing, actuating and fluid control functions. Thus, a number of external components are eliminated.

Since the passive thermal control valve does not require a supply of electricity, the device is immune to power failures. Passive thermal control valve assemblies are compact, lightweight units that offer safe, reliable operation in hazardous or extreme environment applications. For example, such assemblies have been used in aerospace, satellite, and outer space applications. The passive thermal control valve assemblies are often used with Loop Heat Pipes (LHPs). LHPs are versatile heat transfer devices that have been used for thermal control of many commercial communications satellites and NASA's spacecraft and rovers. A 2012 article published by American Institute of Aeronautics and Astronautics describing this is entitled "Passive Control of a Loop Heat Pipe with Thermal Control Valve for Lunar Lander Application," authors John R Hartenstine, Kara L. Walker, and William G. Anderson, Advanced Cooling Technologies, Inc., Lancaster, PA 17601.

Prior thermal control valves typically used a linear valve approach which required large spool travel that increased the size of the valve. Additionally, prior thermal control valves were designed to operate for a larger temperature control range than currently desired and had lower flow rate ratings. The prior thermal control valve would be large, bulky and would take up too much volumetric space if designed to meet the current desired specifications.

It is desired to have a thermal control valve that operates within a tighter temperature control range with higher accuracy and over a wide range of ambient temperature extremes than currently exists. It is also desirable that the thermal control valve has increased flow rate capacity and up to double the flow rate of the existing state-of-the-art thermal control valve. It is further desired that the thermal control valve have a reduced size up to one half the size and weight of existing state-of-the-art thermal control valve assemblies. It would also be desirable to have a miniature passive three-way thermal control valve that can operate as either a mixing valve (i.e., having two liquid inlet ports and one liquid outlet port) or a splitting valve (i.e., having one liquid inlet port and two liquid outlet ports). Such miniature passive thermal control valves could find use in a number of single-phase mechanically pumped fluid thermal control systems and operate within a smaller temperature control range than the existing state-of-the-art valves.

SUMMARY OF THE INVENTION

The present invention is thermal control valve that operates within a tighter temperature control range with higher accuracy and over a wide range of ambient temperature extremes than currently exists. The thermal control valve has increased flow rate and up to double the flow rate of existing state-of-the-art thermal control valve assemblies. The thermal control valve has a reduced size up to approximately one half the size and weight of existing state-of-the-art thermal control valve assemblies. Additionally, the miniature passive three-way thermal control valve that can operate as either a mixing valve (i.e., having two liquid inlet ports—and one liquid outlet port) or a splitting valve (i.e., having one liquid inlet port and two liquid outlet ports).

BRIEF DESCRIPTION OF THE SEVERAL VIEWS OF THE DRAWINGS

The aspects, features, and advantages of the embodiments of the invention mentioned above are described in more detail by reference to the drawings, wherein like reference numerals represent like elements having the same basic function, in which.

DESCRIPTION OF THE PREFERRED EMBODIMENTS

It should be understood at the outset that although illustrative implementations of one or more embodiments are described below, the disclosed assemblies, systems and methods may be implemented using any number of techniques, whether currently known or not yet in existence. The disclosure should in no way be limited to the illustrative implementations, drawings, and techniques described below, but may be modified within the scope of the appended claims along with their full scope of equivalents.

The following brief definition of terms shall apply throughout the application:

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the field of the art;

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiment, or it may be excluded.

Embodiments of the invention will now be described with reference to the figures, in which like numerals reflect like elements throughout. The terminology used in the description presented herein is not intended to be interpreted in any restrictive or limited way, simply because it is being utilized in conjunction with the detailed description of certain specific embodiments of the invention. Furthermore, embodiments of the invention may include several novel features, no single one of which is solely responsible for its desirable attributes or which is essential to practicing the invention described herein.

A preferred embodiment of the passive thermal control valve, generally referred to as 100, will now be described with respect to FIGS. 1, 1A, 2, 3 and 3A. FIG. 2 shows the flow path of a system fluid F through a splitting valve configuration. The splitting valve configuration has one inlet port IP and two outlet ports OP-1 and OP-2. It is to be understood that when the system fluid flow directions are reversed from those shown in FIG. 2, the passive thermal control valve 100 operates as a mixing valve with OP-1 and OP-2 becoming first and second inlet ports and IP becoming a single outlet port.

Figure 1:
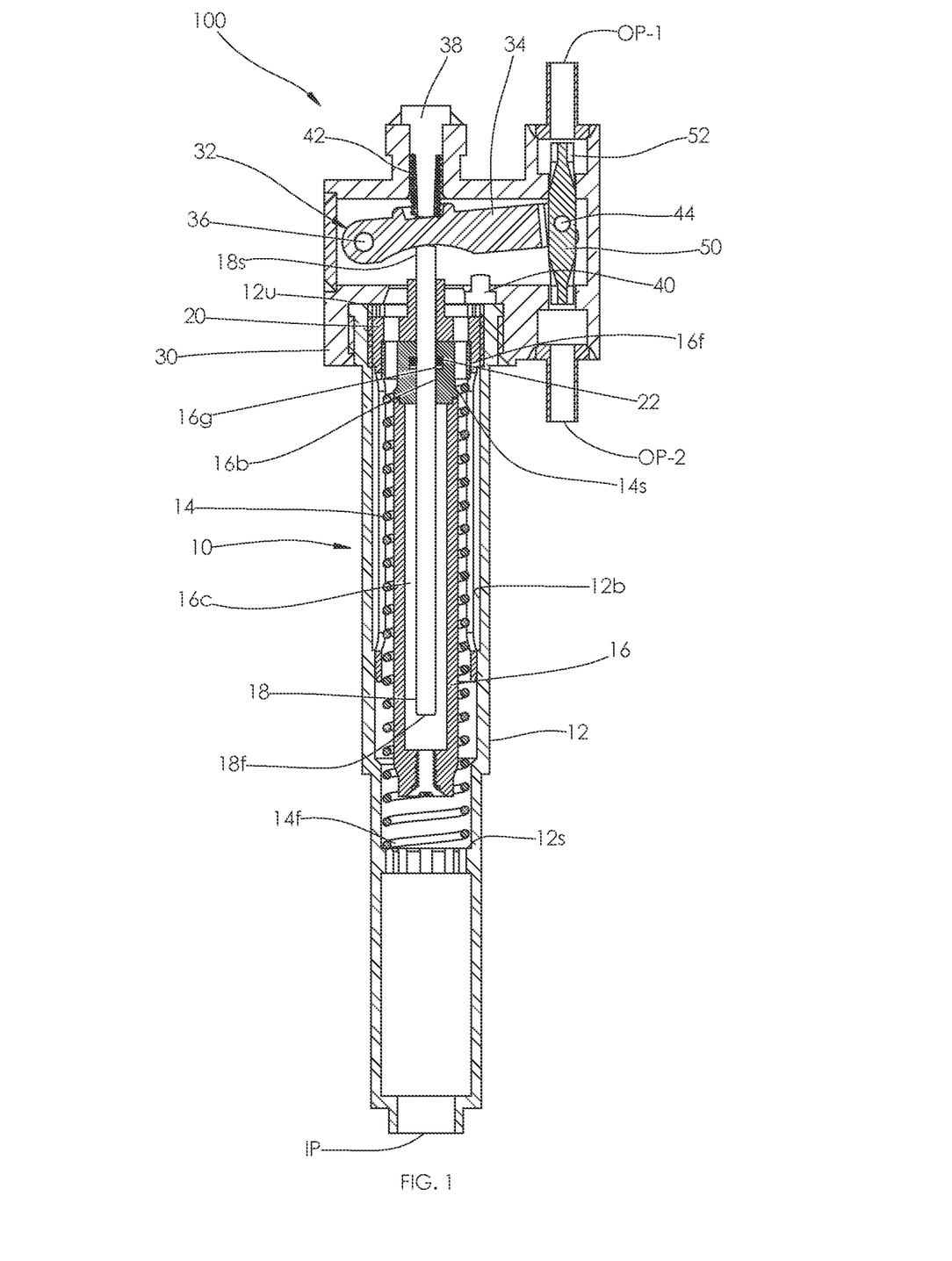
FIG. 1 is a sectional view of a passive thermal control valve according to an embodiment of the present invention with a lever mechanism and valve spool in an upper position.
Figure 2:
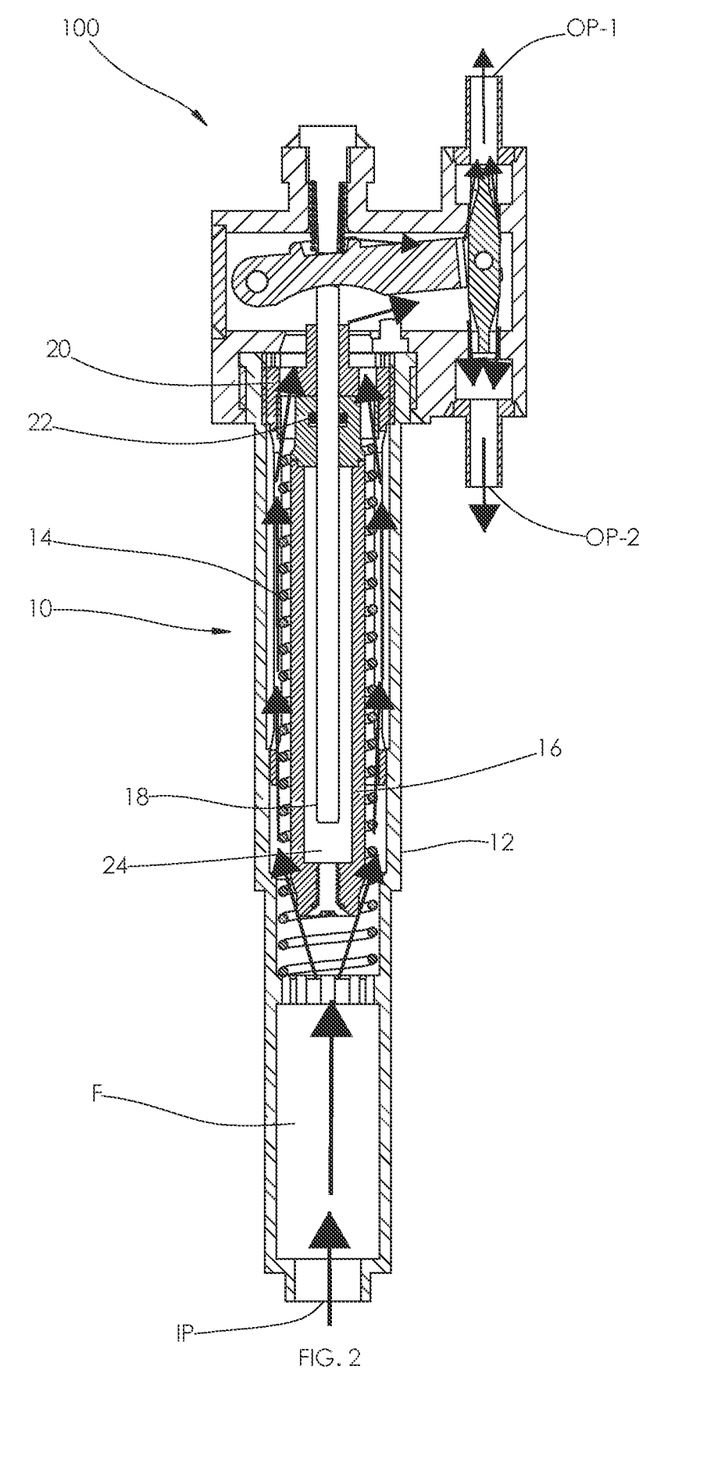
FIG. 2 is a view similar to FIG. 1 showing the fluid flow path through the splitting thermal control valve.

The passive thermal control valve 100 comprises a thermal actuator 10 having an actuator body 12, actuator spring 14, actuator cylinder 16, actuator rod 18 and adjustment stop 20 as shown in FIGS. 1 and 2. Referring to FIG. 1, the actuator body 12 includes an inner bore 12b and a lower interior shoulder 12s. The actuator spring 14 fits within the inner bore 12b and has a first end 14f that abuts the lower interior shoulder 12s of the actuator body 12.

Figure 3:
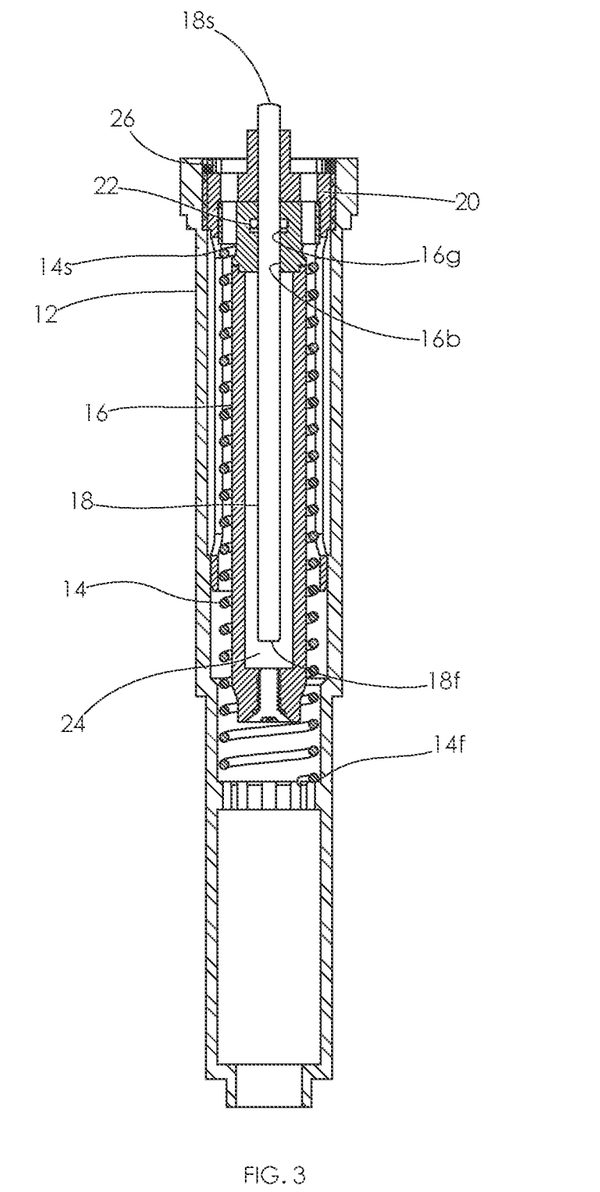
FIG. 3 is a sectional view of the embodiment of the adjustable thermal actuator shown in FIGS. 1 and 2, the adjustable thermal actuator being O-ring sealed.
Figure 3A:
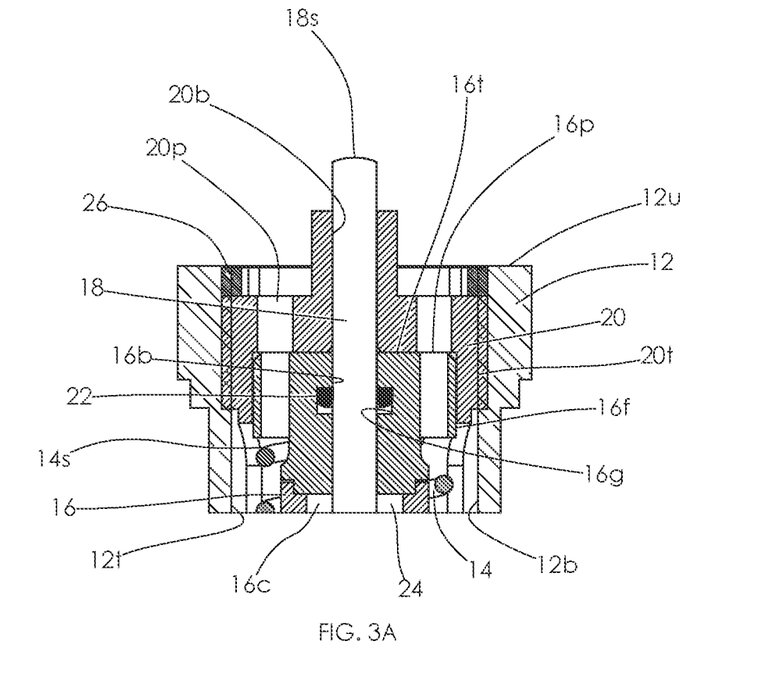
FIG. 3A is an enlarged view of an end portion of the O-ring sealed adjustable thermal actuator.

Referring to FIGS. 3 and 3A, the actuator cylinder 16 has a bore 16b at a top end 16t sized to receive the actuator rod 18. An O-ring 22 received in a cylinder groove 16g forms a seal between the actuator rod 18 and actuator cylinder 16 to form a sealed chamber 16c within the actuator cylinder 16. A thermal or actuator fluid 24 is provided in the sealed chamber 16c as will be discussed in greater detail below. The O-ring 22 separates the actuator fluid 24 from the system fluid F as shown in FIG. 2.

As best shown in FIG. 3A, the actuator cylinder 16 preferably includes an exterior flange 16f at the top end 16t. The exterior flange 16f is arranged and designed to abut a second end 14s of the actuator spring 14. The exterior flange 16f also includes a plurality of ports 16p providing passageways for the system fluid F.

Still referring to FIG. 3A, the adjustment stop 20 preferably has a central bore 20b and an exterior threaded portion 20t for engaging an interior threaded portion 12t of the inner bore 12b of the actuator body 12. The central bore 20b is sized to receive the actuator rod 18. The adjustment stop 20 also includes a plurality of passageways 20p to allow the system fluid F to flow through the adjustment stop 20. An exterior threaded locknut 26 threadably engages the inner bore 12b of the actuator body 12 and locks the position of the adjustment stop 20 as will be discussed below.

Figure 1A:
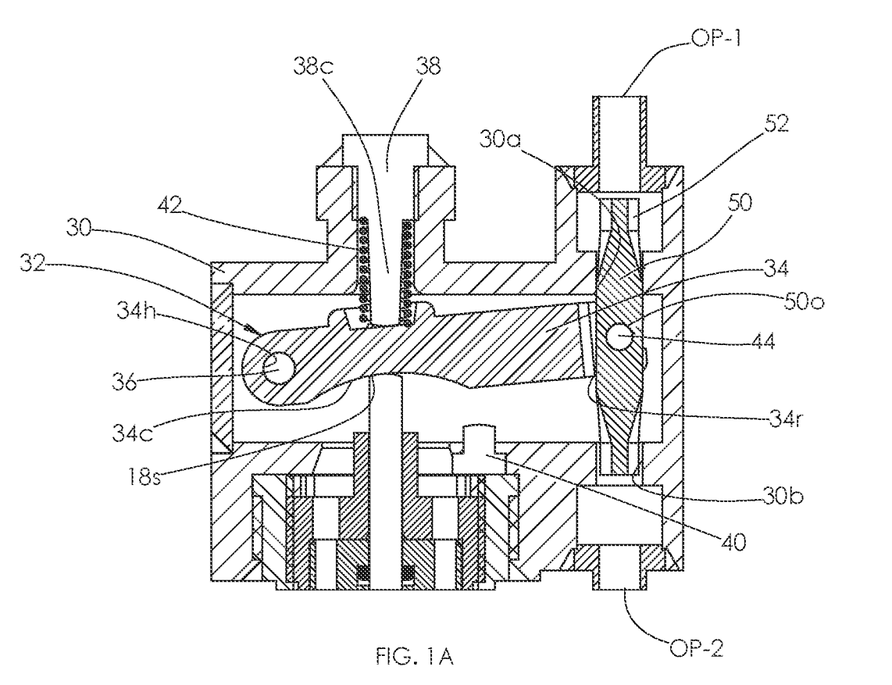
FIG. 1A is an enlarged view of the valve of FIG. 1 with the lever mechanism and valve spool in the upper position.

Referring to FIGS. 1 and 1A, a valve body 30 is mounted to the actuator body 12 of the thermal actuator 10, preferably via a threaded connection. A lever mechanism 32 within the valve body 30 includes a lever 34, a lever pin 36, an upper stop 38, a lower stop 40, a lever spring 42, and a spool pin 44. Referring to FIG. 1A, the lever 34 has a pin hole 34h adjacent to one end of the lever 34 and a spool receiver 34r at an opposite end of the lever 34 adapted to receive a valve spool 50.

It is to be understood that the lever 34 is pin-supported to the valve body 30 via the lever pin 36. Various techniques may be used. Although not shown, one example is a pair of plates mounted within the valve body 30 and spaced to allow the lever 34 to freely fit between the plates with the plates having an aligned hole for receiving the lever pin 36. With the lever pin hole 34h aligned between the hole of the plates, the lever pin 36 is inserted through the aligned holes and the lever 34 is allowed to partially rotate about the lever pin 36. It is to be understood that other techniques may be used to allow the lever 34 to partially rotate about the lever pin 36.

Figure 7:
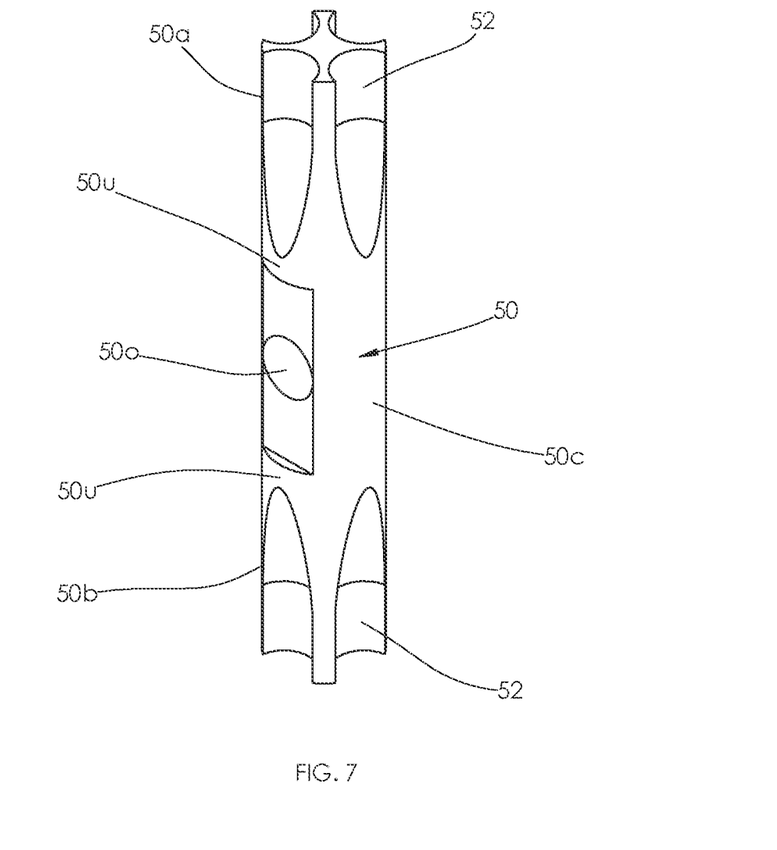
FIG. 7 is a perspective view of a preferred embodiment of the spool body.

Although not fully shown in FIG. 1A, the spool receiver 34r may be a U-shaped member having an arcuate portion joined to a pair of straight leg portions. An aligned spool pin opening extends through each of the straight leg portions of the spool receiver 34r and the valve spool 50 includes a spool opening 50o (FIGS. 1A and 7) through which the spool pin 44 extends.

It is to be understood that the valve body 30 may have one or more openings for assembling the lever mechanism 32 and valve spool 50.

As shown in FIG. 1, preferably the actuator rod 18 has a first end 18f received within the actuator cylinder 16 and a second end 18s outside of the cylinder 16 and which may contact the lever 34, preferably a concave surface 34c (FIG. 1A) of the lever 34. Preferably, the second end 18s of the actuator rod 18 is a spherical cap. In the preferred embodiment, the spherical cap contacts the lever concave surface 34c in a point contact. Also in the preferred embodiment, line contact is made between the lever pin 36 and the lever 34 and between the lever 34 and the spool pin 44.

Referring to FIG. 1A, the upper stop 38 may include a cylindrical lower portion 38c received within the valve body 30 and receiving the lever spring 42. The lever spring 42 may have one end piloted on the lever 34. The lever spring 42 is in compression and exerts a spring force on the lever 34.

Referring to FIGS. 1, 1A, 2 and 7, the preferred embodiment of the valve spool 50 will be described in greater detail. The valve body 30 includes an upper spool guide 30a and a lower spool guide 30b as shown in FIG. 1A. A portion of the valve spool 50 is always within the upper and lower spool guides 30a and 30b. The preferred embodiment of the valve spool 50 is a fluted spool having a plurality of flutes 52 along the circumference of the spool 50. The fluted spool profile is shown in FIG. 1A. The spool 50 has an upper portion 50a and a lower portion 50b separated by a medial portion 50c. The medial portion 50c includes the opening 50o for receiving the spool pin 44. The upper portion 50a includes a plurality of flutes 52 and the lower portion includes a plurality of flutes 52. The valve spool 50 is a cylindrical body that is interrupted by the plurality of flutes 52. Preferably, the flutes 52 terminate towards the medial portion 50c and the spool 50 transitions to an uninterrupted circular cylindrical portion 50u.

Figure 6:
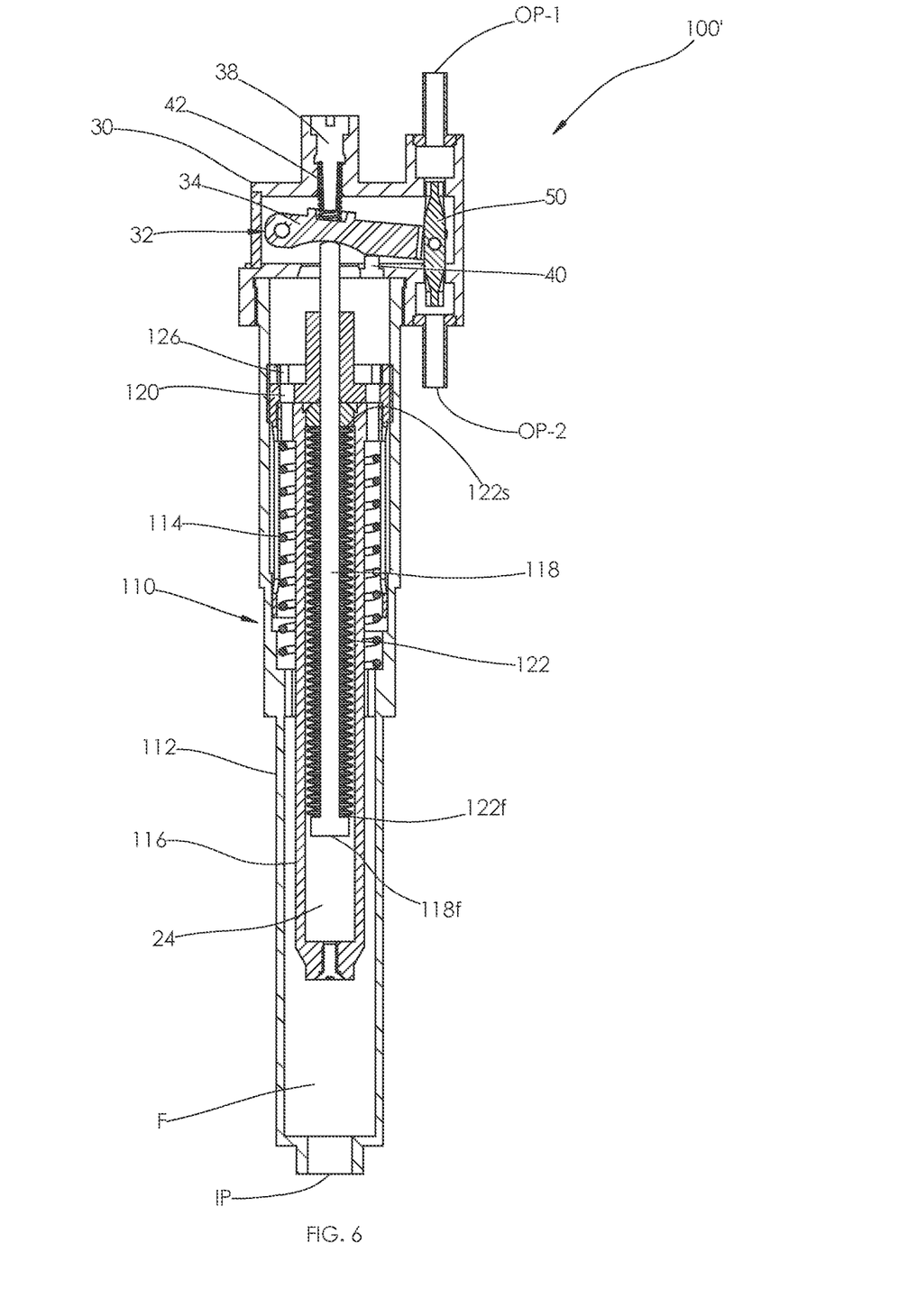
FIG. 6 is a sectional view of the passive thermal control valve according to a second embodiment of the present invention having a bellows sealed adjustable thermal actuator and with the lever mechanism and spool in a lower position.
Figure 6A:
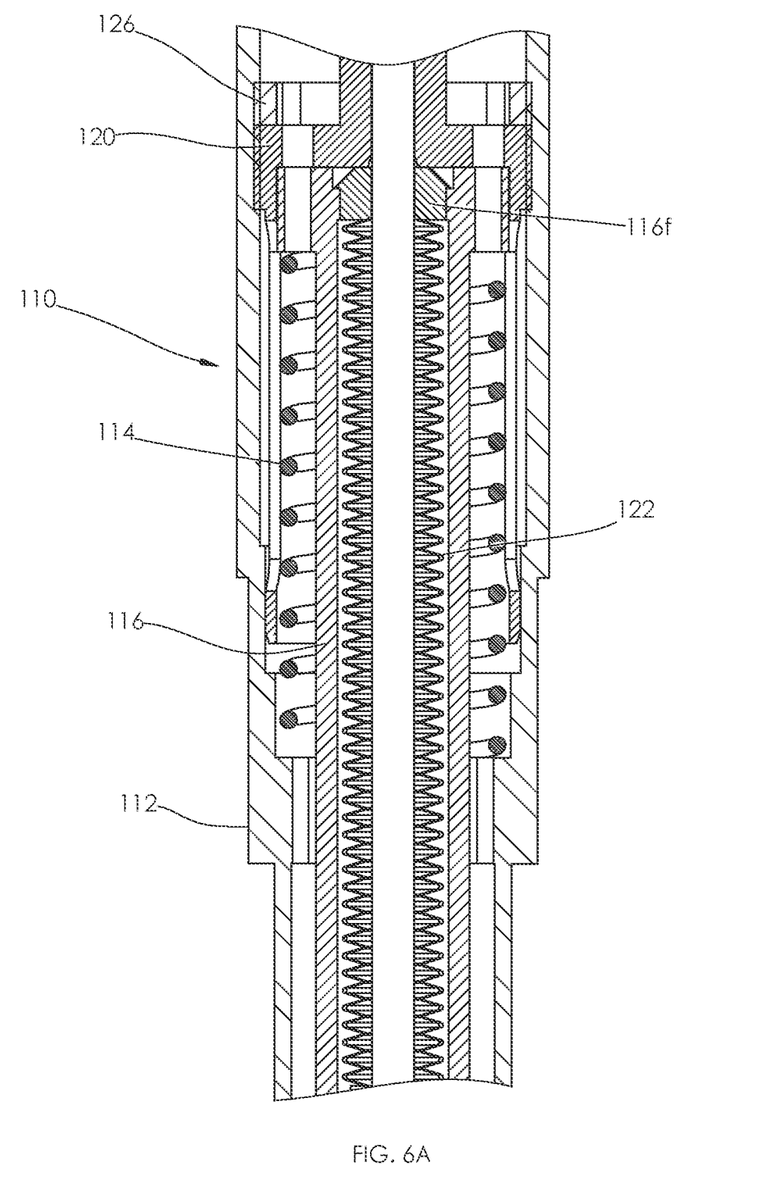
FIG. 6A is an enlarged view of a portion of the actuator of FIG. 6.

When the lever 34 is against the upper stop 38 and the spool 50 is in the upper position as shown in FIG. 1A, the uninterrupted circular cylindrical portion 50u of the valve spool 50 is received within the spool guide 30a. Due to a tight clearance between the spool guide 30a and the uninterrupted circular cylindrical portion 50u, the leakage is very small and fluid flow to the first outlet port OP-1 is effectively closed. Similarly, when the lever 34 is against the lower stop 40 and the spool 50 is in the lower position as shown in FIG. 6, the uninterrupted circular cylindrical portion 50u of the valve spool 50 is received within the spool guide 30b and fluid flow to the second outlet port OP-2 is effectively closed.

Each flute 52 is generally scoop-shaped beginning narrow and shallow adjacent the uninterrupted circular cylindrical portion 50u and gradually becoming wider and deeper along the length of the flute 52. The fluted profile is designed to provide linear trim characteristics through the plurality of flutes 52 along the circumference of the spool 50. The fluted profile is a seat guided design which allows for a tighter clearance between the spool 50 and the spool guides 30a and 30b of the valve body 30 which helps to reduce leakage when the port is closed. Additionally, the seat guided design reduces the axial length of the valve body 30 which reduces the size and weight of the thermal control valve 100.

The assembly, installation, and operation of an embodiment of the thermal actuator 10 will now be described in detail with reference to FIGS. 4A-4E and 5A-5D. It is to be understood that in FIGS. 4A-4E, the adjustment stop 20 of the thermal actuator 10 is set for a temperature control range of −55° C. to −48° C. (a lower extreme temperature control range), whereas in FIGS. 5A-5D the adjustment stop 20 is set for a temperature control range of 83° C. to 90° C., which is a higher extreme temperature control range. The control range is the temperature range in which the spool transition will occur from one port to the other. It is to be further understood that the adjustment stop 20 may be adjusted to other positions within the actuator body 12 for other temperature control ranges.

Figure 4A:
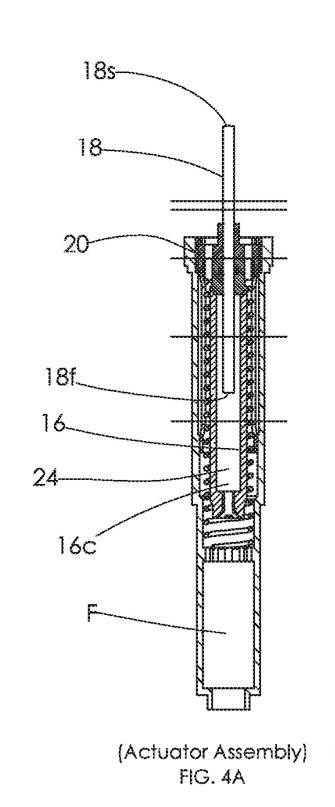
FIGS. 4A to 4E show the O-ring sealed adjustable thermal actuator and positions of the actuator rod and actuator cylinder at different actuator fluid temperatures when an adjustment stop is set for a lower extreme temperature control range.

With reference to FIG. 4A, a predetermined volume of the actuator fluid 24 at room temperature is added to the sealed chamber 16c of the actuator cylinder 16. The position of the actuator rod 18 inside the cylinder 16 in FIG. 4A is based on the predetermined volume of room temperature actuator fluid 24 added to the sealed chamber 16c. Preferably, the entire volume of the sealed chamber 16c is filled with the actuator fluid 24 and a portion of the actuator rod 18.

The actuator spring 14 is positioned in the actuator body 12 with the spring first end 14f contacting the interior shoulder 12s of the actuator body 12. Although not shown, it is to be understood that the actuator spring 14 has a spring free length in a relaxed state. In the preferred embodiment, the free length of the actuator spring 14 is greater than the distance from the lower interior shoulder 12s of the actuator body 12 (FIG. 1) to an upper end 12u of the actuator body 12 (FIG. 3A). The filled actuator cylinder 16 and actuator rod 18 may be inserted into the actuator spring 14 within the actuator body 12 until the spring second end 14s contacts the exterior flange 16f of the cylinder 16.

An actuator spring preload will be determined based on the setting of the adjustment stop 20. For the −55° C. to −48° C. temperature control range setting shown in FIG. 4A, the compression of the actuator spring 14 at room temperature will provide a minimum required preload.

With the second end 18s of the actuator rod 18 extending through the central bore 20b of the adjustment stop 20, the adjustment stop 20 may be brought into contact with the upper portion of the actuator cylinder 16 to compress the actuator spring 14 prior to threading the adjustment stop 20 to the actuator body 12. Preferably, the actuator cylinder 16 is forcibly pushed down via the actuator rod 18, as for example by hand, to a position below the desired adjustment stop position, further compressing the actuator spring 14. The adjustment stop 20 may then be threaded into the actuator body 12 to the desired adjustment stop position shown in FIGS. 4A-4E. The downward force on the actuator rod 18 may be removed and the actuator spring 14 urges the actuator cylinder 16 into contact with the adjustment stop 20. The locknut 26 may then be threaded into the actuator body 12 until it contacts the adjustment stop 20 and locks the position of the adjustment stop 20.

Figure 4B:
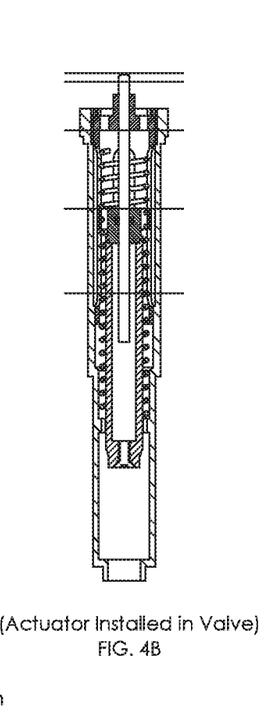

FIG. 4B shows the position of the actuator cylinder 16 and rod 18 when the actuator assembly 10 is installed on the valve body 30 at room temperature. When the actuator assembly 10 is connected to the valve body 30, preferably via a threaded connection, the actuator rod 18 will push the lever 34 against the upper stop 38 of the valve 100 compressing the lever spring 42 (see FIG. 1A). Since the actuator rod 18 cannot be pushed inside the actuator cylinder 16 due to the incompressible actuator fluid 24, the actuator cylinder 16 will slide down within the actuator body 12, further compressing the actuator spring 14. The actuator fluid 24 is still at room temperature and the pressure inside the actuator cylinder 16 will be equivalent to the actuator spring load.

Figure 4C:
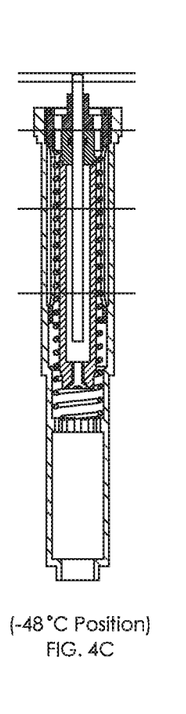

FIG. 4C shows the position of the actuator rod 18 and cylinder 16 at the actuator fluid temperature of −48° C. (i.e., the upper limit control range temperature). As the actuator fluid temperature decreases from the room temperature to the upper limit control range temperature of −48° C., the volume of the actuator fluid 24 will decrease. To compensate for the reduction in actuator fluid volume, the actuator cylinder 16 will retract until it contacts the adjustment stop 20 as shown in FIG. 4C.

As the temperature of the actuator fluid 24 decreases from room temperature to the upper limit control range of −48° C. as illustrated in FIGS. 4B and 4C, the volume of actuator fluid decreases, the cylinder 16 retracts to the adjustment stop 20, the length of the rod 18 within the cylinder 16 increases, and the actuator spring 14 becomes less compressed. It is to be understood that over the entire temperature range from room temperature to −48° C., the second end 18s of the rod 18 has remained in the same position. The position is shown in FIGS. 1A, 4B and 4C. As shown in FIG. 1A, the actuator rod 18 forces the lever 34 against the upper stop 38 and the spool 50 is positioned such that the second outlet port OP-2 is open.

Figure 4D:
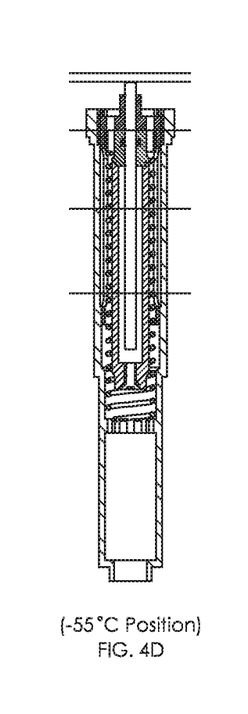

FIG. 4D shows the position of the actuator rod 18 and cylinder 16 at the actuator fluid temperature of −55° C. (i.e., the lower limit control range temperature). As the actuator fluid temperature further decreases from the upper limit control range temperature (−48° C.) to the lower limit control range temperature (−55° C.), the actuator fluid volume further decreases. To compensate for the reduction in the actuator fluid volume, the actuator rod 18 will retract within the cylinder 16 and obtain the position shown in FIG. 4D. As the rod 18 retracts within the cylinder 16, the second end 18s moves to the lower control range position and the lever spring 42 expands and forces the valve spool 50 to the lower position shown in FIG. 6 in which the lever 34 contacts the lower stop 40 and the first outlet port OP-1 is open.

It is to be understood that when the temperature of the actuator fluid 24 is −51.5° C. (i.e., midway between the upper and lower limit control range temperatures), the rod 18 assumes a position midway between the positions shown in FIGS. 4C and 4D and the lever 34 is at a mid-stroke position such that first and second inlet ports OP-1 and OP-2 are equally open (i.e., open the same amount).

Figure 4E:
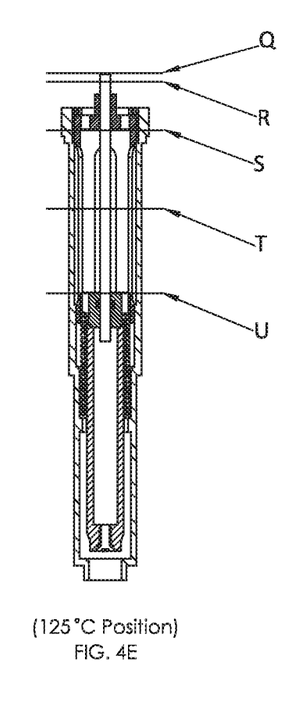

FIG. 4E shows the position of the actuator rod 18 and cylinder 16 at the actuator fluid temperature of 125° C. (i.e., the maximum rated temperature of the valve 100). The actuator rod 18 will be at the upper control range rod position and the position of the valve spool 50 will be such that the second outlet port OP-2 will be open. At this stage, the actuator rod 18 pushes the lever 34 against the upper stop 38 which restricts further travel of the lever 34 and valve spool 50. The actuator rod 18 is restricted from further travel towards the upper stop 38 for any increase in actuator fluid temperature beyond the upper limit control range temperature. To compensate for the increase in actuator fluid volume due to temperature rise from the upper limit control range temperature up to 125° C., the actuator cylinder 16 will move away from the adjustment stop 20, compressing the actuator spring 14 and will obtain the position shown in FIG. 4E.

FIGS. 5A-5D show the thermal actuator 10 set for a temperature control range of 83° C. to 90° C., which is a higher extreme temperature control range of the valve 100. Functioning of the thermal actuator 10 at this control range setting is similar to the one discussed above.

Figure 5A:
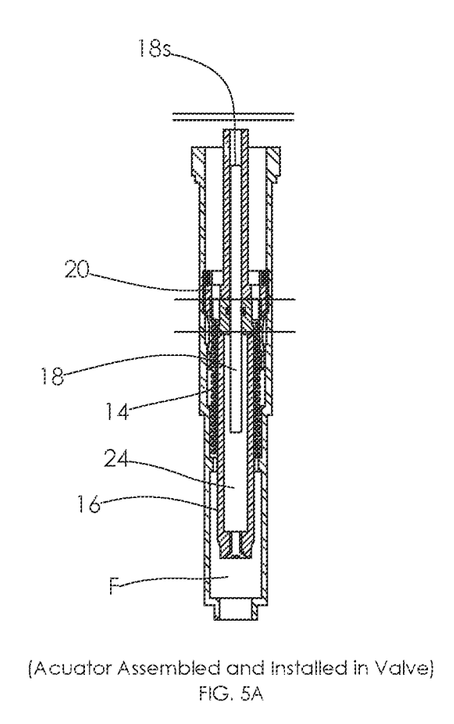
FIGS. 5A to 5D show the O-ring sealed adjustable thermal actuator and positions of the actuator rod and actuator cylinder at different actuator fluid temperatures when the adjustment stop is set for an upper extreme temperature control range.

FIG. 5A shows the adjustment stop 20 in the actuator assembly 10 set for the temperature control range of 83° C. to 90° C. As described above, the actuator fluid 24 in the actuator cylinder 16 is filled at room temperature and the position of the actuator rod 18 inside the cylinder 16 will be determined based on the required actuator fluid volume at the room temperature. The preload of the actuator spring 14 will be determined based on the adjustment stop setting. At 83° C. to 90° C. control range, the actuator spring compression will provide a substantial required preload. As shown in FIG. 5A, the actuator cylinder 16 is in contact with the adjustment stop 20.

FIG. 5A shows the position of the actuator cylinder 16 and rod 18 when the actuator assembly 10 is assembled and installed on the valve body 30 at room temperature. At room temperature, a portion of the actuator rod 18 extends through the adjustment stop 20 but does not extend beyond the upper end 12u of the actuator body 12 and into the valve body 30. The position of the actuator rod 18 is based on the predetermined amount of required actuator fluid 24.

Figure 5B:
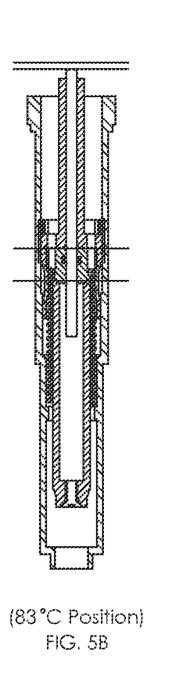

FIG. 5B shows the position of the actuator rod 18 and cylinder 16 at the actuator fluid temperature of 83° C. (lower limit control range temperature). As the temperature of the actuator fluid 24 increases from room temperature to the lower limit control range temperature, the volume of the actuator fluid 24 increases. The increased volume of actuator fluid 24 pushes more of the actuator rod 18 out of the actuator cylinder 16. The second end 18s of the actuator rod 18 will assume the lower control range lever position as shown in FIG. 5B. Preferably, the actuator cylinder 16 remains in contact with the adjustment stop 20 at this temperature as a result of the actuator spring force.

Figure 5C:
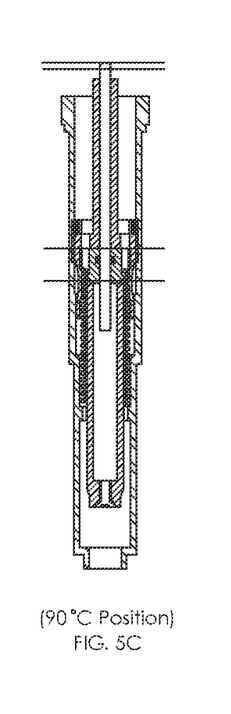

FIG. 5C shows the position of the actuator rod 18 and cylinder 16 at the actuator fluid temperature of 90° C. (upper limit control range temperature). As the actuator fluid temperature further increases from the lower limit control range temperature (83° C.) to the upper limit control range temperature (90° C.), the actuator fluid volume further increases. To compensate for the increase in the actuator fluid volume, the actuator rod 18 will extend further out of the actuator cylinder 16 and obtain the upper control range lever position shown in FIG. 5C. The actuator rod 18 will stroke from the lower limit control range temperature (83° C.) to the upper limit control range temperature (90° C.) which will actuate the valve spool 50 and the spool position will change from the first outlet port OP-1 being open to the second outlet port OP-2 being open. At this stage, the actuator rod 18 will push the lever 34 against the upper stop 38 which will restrict further travel of the lever 34 and the valve spool 50. The actuator rod 18 is restricted from further travel towards the upper stop 38 for any increase in actuator fluid temperature beyond the upper control range temperature. Preferably, the actuator cylinder 16 remains in contact with the adjustment stop at this temperature as a result of the actuator spring force.

Figure 5D:
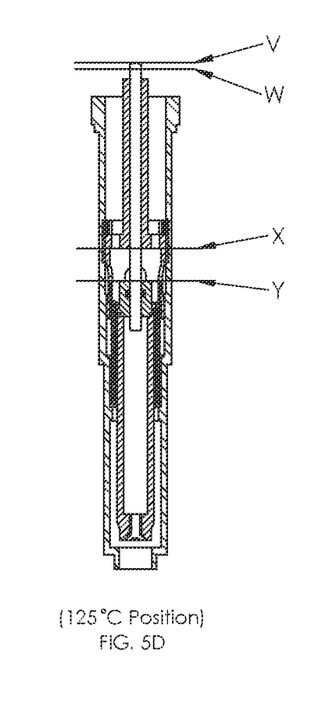

FIG. 5D shows the actuator rod 18 and cylinder 16 positions at the actuator fluid temperature of 125° C. (maximum rated temperature of the valve 100). As the actuator fluid temperature increases from the upper control range temperature to 125° C., the actuator fluid volume increases. To compensate for this increase in the actuator fluid volume, the actuator cylinder 16 will move away from the adjustment stop 20 compressing the actuator spring 14 further and will obtain the position shown in FIG. 5D.

FIG. 6 shows a second embodiment of the passive thermal control valve, designated as 100'. In this second embodiment the valve body 30, lever mechanism 32, upper and lower stops 38 and 40, and valve spool 50 are the same but the thermal actuator 110 has a bellows 122 as opposed to the O-ring sealed design described above. The working principal of both thermal actuators 10 and 110 is the same. The primary difference between the two embodiments is the way the system fluid F and the actuator fluid 24 are isolated from each other. In the bellows sealed thermal actuator 110, the bellows 122 separates the actuator fluid 24 from the system fluid F.

With reference to FIG. 6, the thermal actuator 110 includes an actuator body 112, actuator spring 114, actuator cylinder 116, adjustment stop 120, locknut 126 and actuator/thermal fluid 24. It is to be understood that these components are similar to the components described above with respect to the O-ring sealed thermal actuator 10. A first end 122*f* of the bellows 122 is sealingly affixed, preferably by welding, to a first end 118*f* of the bellows rod 118. A second end 122*s* of the bellows 122 is affixed to a top flange 116*f* of the cylinder 116. As the bellows 122 compresses, the bellows rod 118 is pushed outward.

The thermal fluid 24 is between the bellows 122 and the cylinder 116. The system fluid F is between the actuator body 112 and the cylinder 116 and also between the bellows 122 and the rod 118 as there is a clearance between the rod 118 and the top flange 116*f* which allows system fluid F to enter.

It is to be understood that the bellows sealed thermal actuator 110 functions similarly to the O-ring sealed thermal actuator 10. The above discussion relating to FIGS. 4A-4E and 5A-5D also pertain to the bellows sealed thermal actuator 110.

In the splitting configuration, the working fluid F enters the valve 100, 100' through a single inlet port IP and the outlet flow is split between two outlet ports OP-1 and OP-2 based on the position of the valve spool 50.

The linear thermal control valve 100, 100' includes a linear thermal actuator 10, 110 that strokes in response to a change in temperature of the working fluid F and has a lever mechanism 32 that amplifies the linear stroke of the thermal actuator 10, 110 and actuates the spool 50, with the spool controlling the system fluid flow based on its linear position in the valve body 30. This design significantly reduces the linear stroke requirement of the thermal actuator 10, 110 compared to existing thermal control valves because of the stroke amplification achieved by the lever mechanism 32.

A suitable system fluid F is Fluorinert® Electronic Liquid FC-72, a product of 3M Company, and a suitable actuator fluid is Dow Corning® 200. The O-ring 22 may be made of EPDM (Ethylene Propylene Diene Monomer) elastomer which is suitable for the discussed temperature ranges. Additionally, EPDM is compatible with the system fluid (FC-72) and the actuator fluid (DC-200). A suitable material for the actuator rod and adjustment stop is silicon bronze (C65100) and 304 Stainless Steel for the actuator cylinder, actuator body, locknut, and actuator spring.

It is to be understood that the thermal actuator 10, 110 in the preferred embodiments actuates the valve spool 50 via the lever mechanism 32. The lever mechanism 32 amplifies the actuator stroke and provides a longer stroke at the valve spool 50. This results in a smaller actuator stroke for a given spool stroke. The smaller actuator stroke requires less actuator fluid volume which further reduces the size and weight of the thermal control valve 100, 100'. In existing state-of-the-art thermal control valves, the thermal actuator is in-line with the spool axis which does not provide the stroke amplification benefit of the preferred embodiments of the present invention.

It is to be understood that the actuator/bellows rod 18, 118 of the thermal actuator 10, 110 in the preferred embodiments will stroke only during the temperature change that occurs within the set control range. For any temperature increase outside of the set control range, the actuator cylinder 16, 116 will extend instead of the actuator rod 18, 118 to accommodate expansion in the actuator fluid volume. Since the travel of the actuator rod 18, 118 is fixed, the spool 50 connected to the actuator rod 18, 118 via the lever mechanism 32 will also have a fixed travel. This eliminates the spool stroking beyond the set temperature control range which significantly reduces the axial length and weight of the thermal control valve 100, 100'. In existing state-of-the-art thermal control valves, the spool travel is equal to the total actuator stroke because the spool is directly connected to the actuator rod. The total axial length of existing state-of-the-art thermal control valves is a multiplier of the total actuator stroke, which makes the valve bigger and heavier.

Additional benefits and advantages of the preferred embodiments of the present invention include the following.

1) The thermal fluid expansion during the temperature change outside of the control range is accommodated inside the actuator 10, 110 instead of continuing to move or put force on the spool 50.

2) The actuator stroke length for a fixed spool stroke is much smaller because of the amplification provided by the lever mechanism 32, which reduces the size of the actuator and the valve.

3) The extension of the actuator cylinder 16, 116 to compensate for the changing thermal fluid volume is much smaller because of the smaller actuator stroke, which reduces the size of the actuator and the valve.

4) The length of the valve body 30 is reduced by combining the flow passages with the spool guide 30*a*, 30*b*.

5) The valve spool 50 has fluted scoops and a conical shape that goes into the spool guide 30*a*, 30*b* to decrease the flow at a controlled rate and providing a linear flow transition.

6) The actuator and flow path are combined to further reduce space.

NOMENCLATURE LIST system fluid F
inlet port IP
first outlet port OP-1
second outlet port OP-2
thermal actuator 10
actuator body 12
inner bore 12*b*
interior shoulder 12*s* interior threaded portion 12t
upper end 12u
actuator spring 14
first end 14f
second end 14s
actuator cylinder 16
bore 16b
sealed chamber 16c
exterior flange 16f
cylinder groove 16g
ports 16p
top end 16t
actuator rod 18
first end 18f
second end 18s
adjustment stop 20
central bore 20b
passageways 20p
exterior threaded portion 20t
O-ring 22
thermal/actuator fluid 24
locknut 26
valve body 30
upper spool guide 30a
lower spool guide 30b
lever mechanism 32
lever 34
concave surface 34c
pin hole 34h
spool receiver 34r
lever pin 36
upper stop 38
cylindrical portion 38c
lower stop 40
lever spring 42
spool pin 44
valve spool 50
upper portion 50a
lower portion 50b
medial portion 50c
opening 50o
uninterrupted circular cylindrical portion 50u
flutes 52
passive thermal control valve 100, 100'
thermal actuator 110
actuator body 112
actuator spring 114
actuator cylinder 116
top flange 116f
bellows rod 118
first end 118f
adjustment stop 120
bellows 122
first end 122f
second end 122s
locknut 126

The foregoing disclosure and description of the invention are illustrative and explanatory thereof, and various changes in the size, shape and materials, as well as in the details of the illustrated construction, may be made without departing from the spirit of the invention. The present embodiments are, therefore, to be considered as merely illustrative and not restrictive, the scope of the invention being indicated by the claims rather than the foregoing description, and all changes which come within the meaning and range of equivalence of the claims are therefore intended to be embraced therein.

While the invention has been described in detail above with reference to specific embodiments, it will be understood that modifications and alterations in the embodiments disclosed may be made by those practiced in the art without departing from the spirit and scope of the invention. All such modifications and alterations are intended to be covered. In addition, all publications cited herein are indicative of the level of skill in the art and are hereby incorporated by reference in their entirety as if each had been individually incorporated by reference and fully set forth.

We claim:

1. A passive thermal control valve for controlling flow of a system fluid, the control valve comprising:
    a thermal actuator comprising:
        an actuator body having an inner bore;
        a stop engaging the actuator body;
        a cylinder received within the inner bore of the actuator body, the cylinder having a cylinder bore open at one end;
        an actuator spring within the inner bore of the actuator body biasing the cylinder towards the stop;
        an actuator rod having a first end and a second end, the actuator rod at least partially received within the cylinder, at least a portion of the actuator rod and the rod second end allowed to extend through the open end of the cylinder bore;
        a sealing element forming a seal between the actuator rod and the cylinder and defining a sealed chamber within the cylinder; and
        a thermal fluid contained within the sealed chamber;
    a valve body connected to the actuator body; and
    a valve spool movably positioned within the valve body.

2. The passive thermal control valve of claim 1, wherein the stop engages an upper portion of the actuator body.

3. The passive thermal control valve of claim 1, wherein the stop engages an upper portion of the actuator body via threads.

4. The passive thermal control valve of claim 1, wherein the position of the stop relative to the actuator body is adjustable.

5. The passive thermal control valve of claim 4, wherein the stop threadably engages the actuator body.

6. The passive thermal control valve of claim 1, wherein the valve body has first and second ports, and
    wherein the passive thermal control valve has a temperature control range in which the valve spool transitions from closing the first port to closing the second port, the temperature being the temperature of the system fluid, the temperature control range defined by an upper temperature and a lower temperature, wherein the valve spool closes the first port at the upper temperature of the control range and the valve spool closes the second port at the lower temperature of the control range.

7. The passive thermal control valve of claim 6, wherein during a temperature change from the upper temperature to the lower temperature of the temperature control range, the actuator rod moves relative to the cylinder and relative to the actuator body.

8. The passive thermal control valve of claim 7, wherein the passive thermal control valve has a maximum rated temperature higher than the upper temperature of the control range, and the actuator rod remains stationary relative to the actuator body for temperatures from the upper temperature of the control range to the maximum rated temperature.

9. The passive thermal control valve of claim 8, wherein the cylinder remains stationary relative to the actuator body in the control temperature range but moves relative to the rod and actuator body for temperatures from the upper temperature of the control range to the maximum rated temperature.

10. The passive thermal control valve of claim 6, further comprising:
a lever pin-supported to the valve body and connected to the valve spool; and
the second end of the actuator rod configured to contact the lever when in the temperature control range.

11. The passive thermal control valve of claim 10, wherein in the temperature control range a small axial movement of the actuator rod results in a larger axial movement of the valve spool.

12. The passive thermal control valve of claim 10, further comprising:
a lever upper stop within the valve body limiting upward movement of the lever; and
a lever lower stop within the valve body limiting downward movement of the lever.

13. The passive thermal control valve of claim 12, wherein the lever upper stop is configured to contact the lever at the upper temperature of the control range and the lever lower stop is configured to contact the lever at the lower temperature of the control range.

14. The passive thermal control valve of claim 12, further comprising a lever spring biasing the lever towards the lever lower stop.

15. The passive thermal control valve of claim 10, further comprising:
a lever upper stop within the valve body limiting upward movement of the valve spool; and
a lever lower stop within the valve body limiting downward movement of the valve spool.

16. The passive thermal control valve of claim 10, wherein the valve spool closes the second port when the lever is in a lower position and closes the first port when the lever is in an upper position.

17. The passive thermal control valve of claim 10, further comprising a lever upper stop and a lever lower stop, the lever upper and lower stops limit the axial movement of the valve spool.

18. The passive thermal control valve of claim 1, wherein the actuator body has an actuator body port at a lower end of the actuator body and the actuator body is coupled to the valve body at an upper end of the actuator body.

19. The passive thermal control valve of claim 18, wherein the valve body has first and second ports for the system fluid.

20. The passive thermal control valve of claim 19, further comprising a system fluid flow path from the actuator body port to the first and second ports.

21. The passive thermal control valve of claim 20, wherein the system fluid flow path comprises an area in the inner bore of the actuator body outside of the cylinder and into the valve body to the first and second ports.

22. The passive thermal control valve of claim 1, wherein the valve body includes an upper spool guide and a lower spool guide, and
the valve spool comprises an upper portion and a lower portion separated by a medial portion, the upper and lower portions each having a plurality of flutes along a circumference of the valve spool, at least a portion of the upper portion of the valve spool is in the upper spool guide and at least a portion of the lower portion of the valve spool is in the lower spool guide.

23. The passive thermal control valve of claim 22, wherein each flute is generally scoop-shaped beginning narrow and shallow adjacent the medial portion and gradually becoming wider and deeper along the length of the flute.

24. The passive thermal control valve of claim 23, wherein the axial positioning of the plurality of flutes within the upper spool guide controls the flow rate of the system fluid through the first port and provides a linear flow transition.

25. The passive thermal control valve of claim 10, wherein the actuator rod actuates the valve spool via the lever, and
wherein the actuator rod has a rod stroke required to move the lever from a lever lower position to a lever upper position, and the valve spool has a spool stroke required to move from closing the spool body second port to closing the spool body first port, and the lever mechanism amplifies the rod stroke to provide a longer spool stroke.

26. The passive thermal control valve of claim 19, wherein the first and second ports of the valve body are first and second inlet ports and the actuator body port is an outlet port for the system fluid.

27. The passive thermal control valve of claim 26, further comprising a system fluid flow path from the first and second inlet ports to the outlet port.

28. The passive thermal control valve of claim 10, wherein the valve spool transitions between a lower spool position in which the second port is closed to an upper spool position in which the first port is closed over the temperature control range,
wherein at the lower control range temperature the valve spool is in the lower spool position and the lever is in the lever lower position,
wherein as the temperature rises above the lower control range temperature, the thermal fluid within the cylinder expands, forcing the actuator rod to push on the lever and raise it from the lever lower position which raises the valve spool from the lower spool position, and
wherein at the upper control range temperature the thermal fluid within the cylinder has expanded to force the actuator rod to push on the lever and raise it to the lever upper position which positions the valve spool in the upper spool position.

29. The passive thermal control valve of claim 28, wherein as the temperature of the thermal fluid exceeds the upper control range temperature, the thermal expansion of the thermal fluid forces the cylinder in a direction away from the adjustment stop, further compressing the actuator spring.

30. The passive thermal control valve of claim 1, wherein the sealing element comprises a seal ring and the cylinder includes a cylinder groove, wherein the seal ring is received in the cylinder groove and forms a seal between the actuator rod and the cylinder.

31. The passive thermal control valve of claim 1, wherein the sealing element comprises a bellows within the cylinder extending over a portion of the rod, a bellows first end sealingly affixed adjacent a first end of the rod and a bellows second end affixed to a top flange of the cylinder,
wherein the sealed chamber includes the area between the bellows and the cylinder.

32. A passive thermal control valve for controlling flow of a system fluid, the control valve comprising:
a thermal actuator comprising:
an actuator body having an inner bore;
a stop engaging the actuator body;
a cylinder received within the inner bore of the actuator body, the cylinder having a cylinder bore open at one end;

an actuator spring within the inner bore of the actuator body biasing the cylinder towards the stop;

an actuator rod having a first end and a second end, the actuator rod at least partially received within the cylinder, at least a portion of the actuator rod and the rod second end allowed to extend through the open end of the cylinder bore;

a bellows within the cylinder extending over a portion of the rod, a bellows first end sealingly affixed to a first end of the rod and a bellows second end affixed to a top flange of the cylinder; and a thermal fluid contained within the cylinder on the outside of the bellows;

a valve body connected to the actuator body; and a valve spool movably positioned within the valve body.

33. The passive thermal control valve of claim 32, wherein system fluid occupies the space inside the bellows.

34. A method for passively controlling flow of a system fluid to a first outlet port, a second outlet port, or to first and second outlet ports of a thermal control valve depending on the temperature of the system fluid, with the thermal control valve comprising an actuator body, a cylinder within an inner bore of the actuator body, an actuator rod at least partially received within the cylinder and a thermal fluid contained within the cylinder, the thermal control valve having a system fluid temperature control range, the method comprising the steps of:

passively adjusting the flow of the system fluid to the first outlet port, the second outlet port, or the first and second outlet ports as the system fluid temperature changes within the temperature control range by moving the actuator rod relative to the cylinder and the actuator body;

passively controlling the flow of the system fluid through the first outlet port for system fluid temperatures below the temperature control range; and passively controlling the flow of the system fluid through the second outlet port for system fluid temperatures above the temperature control range by moving the cylinder relative to the actuator rod and actuator body.

* * * * *